(12) United States Patent
Yamagishi et al.

(10) Patent No.: US 9,282,351 B2
(45) Date of Patent: Mar. 8, 2016

(54) CONTENT DELIVERY APPARATUS, CONTENT DELIVERY METHOD, AND TRANSMITTING SERVER

(75) Inventors: Yasuaki Yamagishi, Kanagawa (JP); Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/583,214

(22) PCT Filed: Feb. 24, 2011

(86) PCT No.: PCT/JP2011/054827
§ 371 (c)(1),
(2), (4) Date: Sep. 6, 2012

(87) PCT Pub. No.: WO2011/111587
PCT Pub. Date: Sep. 15, 2011

(65) Prior Publication Data
US 2012/0331513 A1    Dec. 27, 2012

(30) Foreign Application Priority Data

Mar. 11, 2010  (JP) .................................. 2010-055106

(51) Int. Cl.
*H04N 7/173* (2011.01)
*H04N 21/2362* (2011.01)
(Continued)

(52) U.S. Cl.
CPC ....... *H04N 21/2362* (2013.01); *H04N 21/2385* (2013.01); *H04N 21/2393* (2013.01);
(Continued)

(58) Field of Classification Search
CPC  H04N 21/2362; H04N 21/2385; H04N 21/24

USPC ....................................................... 725/95, 96
See application file for complete search history.

(56) References Cited

U.S. PATENT DOCUMENTS

| | | | |
|---|---|---|---|
| 6,718,552 B1 * | 4/2004 | Goode | 725/95 |
| 2002/0067766 A1 | 6/2002 | Sakamoto et al. | |

(Continued)

FOREIGN PATENT DOCUMENTS

| | | |
|---|---|---|
| CN | 1346572 A | 4/2002 |
| CN | 101193448 A | 6/2008 |

(Continued)

OTHER PUBLICATIONS

International Search Report for International Application No. PCT/JP2011/054827 mailed Apr. 5, 2011 from the Japanese Patent Office.

(Continued)

*Primary Examiner* — Olugbenga Idowu
(74) *Attorney, Agent, or Firm* — Oblon, McClelland, Maier & Neustadt, L.L.P.

(57) ABSTRACT

The delivery of content is performed over a cable network with a high capacity, and data for control is exchanged over an IP network. A VoD channel is allocated to a bandwidth of a cable network (1) which is divided for every region beforehand, and thus the VoD channel is dynamically allocated in response to the demand for VoD streaming from an end device (11). A head end includes a broadcasting server (2), a control information server (3), a VOD server (4), a regional page server (5), and a multiplexer (6). The control information server (3) broadcasts or sends DVB-SI used to form information for enabling selection of a program, or AIT for control of a browser page. The end device (11) exchanges data for obtaining content and data for stream reproduction control with the head end over the Internet (17).

12 Claims, 6 Drawing Sheets

(51) Int. Cl.
    *H04N 21/2385* (2011.01)
    *H04N 21/239* (2011.01)
    *H04N 21/472* (2011.01)
    *H04N 21/61* (2011.01)
    *H04N 21/8545* (2011.01)
    *H04N 21/6547* (2011.01)
    *H04L 12/18* (2006.01)
    *H04N 21/222* (2011.01)

(52) U.S. Cl.
    CPC ..... *H04N21/47202* (2013.01); *H04N 21/6118* (2013.01); *H04N 21/6175* (2013.01); *H04N 21/6547* (2013.01); *H04N 21/8545* (2013.01); *H04L 12/1886* (2013.01); *H04N 21/2221* (2013.01)

(56) References Cited

U.S. PATENT DOCUMENTS

| | | | |
|---|---|---|---|
| 2005/0038996 A1* | 2/2005 | Meyerson | 713/165 |
| 2007/0192793 A1* | 8/2007 | Song et al. | 725/39 |
| 2007/0245019 A1 | 10/2007 | Westberg | |
| 2008/0216138 A1* | 9/2008 | Minnick | 725/110 |
| 2009/0116379 A1* | 5/2009 | Rahman | 370/229 |
| 2011/0145869 A1* | 6/2011 | Rahman | 725/87 |

FOREIGN PATENT DOCUMENTS

| | | |
|---|---|---|
| EP | 0 872 987 | 10/1998 |
| EP | 1 424 853 | 5/2004 |
| EP | 1 732 326 | 12/2006 |
| EP | 2 099 221 | 9/2009 |
| EP | 2 099 221 A2 | 9/2009 |
| JP | 10-290445 | 10/1998 |
| JP | A HEI 10-290445 | 10/1998 |
| JP | 2002-135756 | 5/2002 |
| JP | A 2002-135756 | 5/2002 |
| JP | 2002-247552 | 8/2002 |
| JP | A 2002-247552 | 8/2002 |
| WO | WO 00/62547 | 10/2000 |

OTHER PUBLICATIONS

Extended European Search Report for PCT/JP2011054827; dated Nov. 11, 2013 (12 pages).
DVB Organization: "CM-AVC0133 CM0848 CRs Hybrid Broadcast-Broadband Services.pdf," DVB, Digital Broadcasting, c/o EBU—17A Ancieene Route—CH-1218 Grand Saconnex, Geneva, Switzerland, May 17, 2008 (19 pages).
ETS 300 802; Digital Video Broadcasting (DVB); Network-Independent protocols for DVB Interactive services, Nov. 1, 1997 (22 pages).
State Intellectual Property Office of People's Republic of China Office Action issued Aug. 11, 2014 re Appln. No. 201180012363.1.
State Intellectual Property Office of People's Republic of China, Office Action issued on Jan. 15, 2015 for the Patent Application No. 201180012363.1.

* cited by examiner

CONTENT DELIVERY APPARATUS, CONTENT DELIVERY METHOD, AND TRANSMITTING SERVER

TECHNICAL FIELD

The present disclosure relates to a content delivery apparatus, a content delivery method, and a transmitting server for use in a content delivery service over a network.

BACKGROUND ART

IPTV (Internet Protocol Television) is a generic term for a service which performs digital TV broadcasting over an IP network or delivers content such as an image, or for the broadcasting technology. There is VOD (Video On Demand), as the content delivery service, which provides content in response to a delivery demand from an end device.

A conventional IPTV delivery system is a system in which both a control message and an AV stream of content are transmitted over the same bidirectional IP network. The system is disclosed in Patent Document 1, which suitably changes a deliver form and then delivers the content, in the content delivery system. In the content delivery system disclosed in Patent Document 1, a delivery server and a client terminal are connected to each other over a network, for example, over the Internet. Upward information, such as a request from the client terminal for delivery, and downward information, such as the content delivered from the content server are all exchanged over the Internet.

CITATION LIST

Patent Document

Patent Document: Japanese Patent Application Laid-Open No. 2009-296484

SUMMARY OF THE INVENTION

Problems to be Solved by the Invention

However, when a bandwidth of the IP network is insufficient, the quality of the content being delivered may be degraded. To prevent the degradation in quality, the IP network needs to allow for a stream of a large amount of data thereon. On the other hand, there is a cable broadcasting network, existing or newly-installed, that has abundant, unused bandwidths. For a device that is not in an environment where the connection to the IP network is available, and a device that uses the bidirectional IP network of which bandwidth is not sufficient, delivery of an AV stream over the cable broadcasting network may be an efficient way of using the network resources.

Therefore, an object of the present disclosure is to provide a content delivery apparatus, a content delivery method, and a transmitting server which can efficiently use abundant bandwidths of a broadcasting network for a VOD service of IPTV.

Solutions to Problems

In order to achieve the above object, there is provided a content delivery system having a configuration in which, a transmitting server and a client terminal are connected to each other over a first network with a sufficient downward transmission bandwidth for transmitting content, and a second network which is a bidirectional IP network, broadcasting content, content which the client terminal demands, and control information including address information used to access the transmitting server are transmitted, from the transmitting server to the client terminal over the first network, the client terminal accesses the transmitting server that is specified using address information, over the second network, and information used to obtain the content and information used to control reproduction of the content are exchanged between the client terminal and the transmitting server over the second network.

The present disclosure provides a content delivery method to be performed by a content delivery system having a configuration in which a transmitting server and a client terminal are connected to each other over a first network with a sufficient downward transmission bandwidth for transmitting content, and a second network which is a bidirectional IP network, and broadcasting content, content which the client terminal demands, and control information including address information used to access the transmitting server are transmitted, from the transmitting server to the client terminal over the first network, the content delivery method including: specifying the transmitting server using the address information and causing the client terminal to access the transmitting server over the second network; causing the client terminal to exchange information used to obtain the content and information used to control reproduction of the content with the transmitting server over the second network; and causing the client terminal to reproduce the content delivered over the first network.

The present disclosure provides a transmitting server: being connected to a client terminal via a first network with a sufficient downward transmission bandwidth for transmitting content and a second network which is a bidirectional IP network, the transmitting server transmitting broadcasting content, content demanded by the client terminal, and control information including address information used by the client terminal to access the transmitting server, to the client terminal over the first network, and exchanging information used to obtain the content and information used to control reproduction of the content, with the client terminal over the second network.

Preferred aspects are as follows.

A plurality of channels is included in the first network, the broadcasting content is delivered to the client terminal over one or a plurality of channels of the first network, a channel, other than the channel on which the broadcasting content is to be delivered, is allocated for delivery of the content demanded by the client terminal, and information on allocation of the channel is stored.

The content is delivered over the second network, when channels allocatable for delivery of the content is smaller in number than the client terminals which demand the content.

The transmitting server includes: a broadcasting server configured to deliver the broadcasting content; a control information server configured to deliver the control information; and a content server configured to deliver the content, wherein each of the broadcasting server, the control information server, and the content server outputs a stream.

The first network is a cable television network, and the second network is the Internet.

Effects of the Invention

In at least one embodiment, information which is initially necessary to obtain content, information for delivering content itself over the first network with a broad bandwidth and obtaining the content, and data for reproduction control of the content are exchanged over the second network which is a bidirectional IP network. Therefore, the content can be delivered over the first network. In addition, the content can be delivered also over the second network when the content delivery channels are insufficient in number, which enables flexible response to the demand from the client terminal.

MODE FOR CARRYING OUT THE INVENTION

Embodiments of the present disclosure will be described below in the following order.
<1. One Embodiment of the Present Disclosure>
<2. Variation>

Embodiments to be described below are suitable specific examples of the present disclosure, and have technically desirable limitations, but the scope of the present disclosure is not limited to the embodiments, if there is no mention that the present disclosure is limited, in the description below.

1. One Embodiment of the Present Disclosure

Content Delivery System

Figure 1:
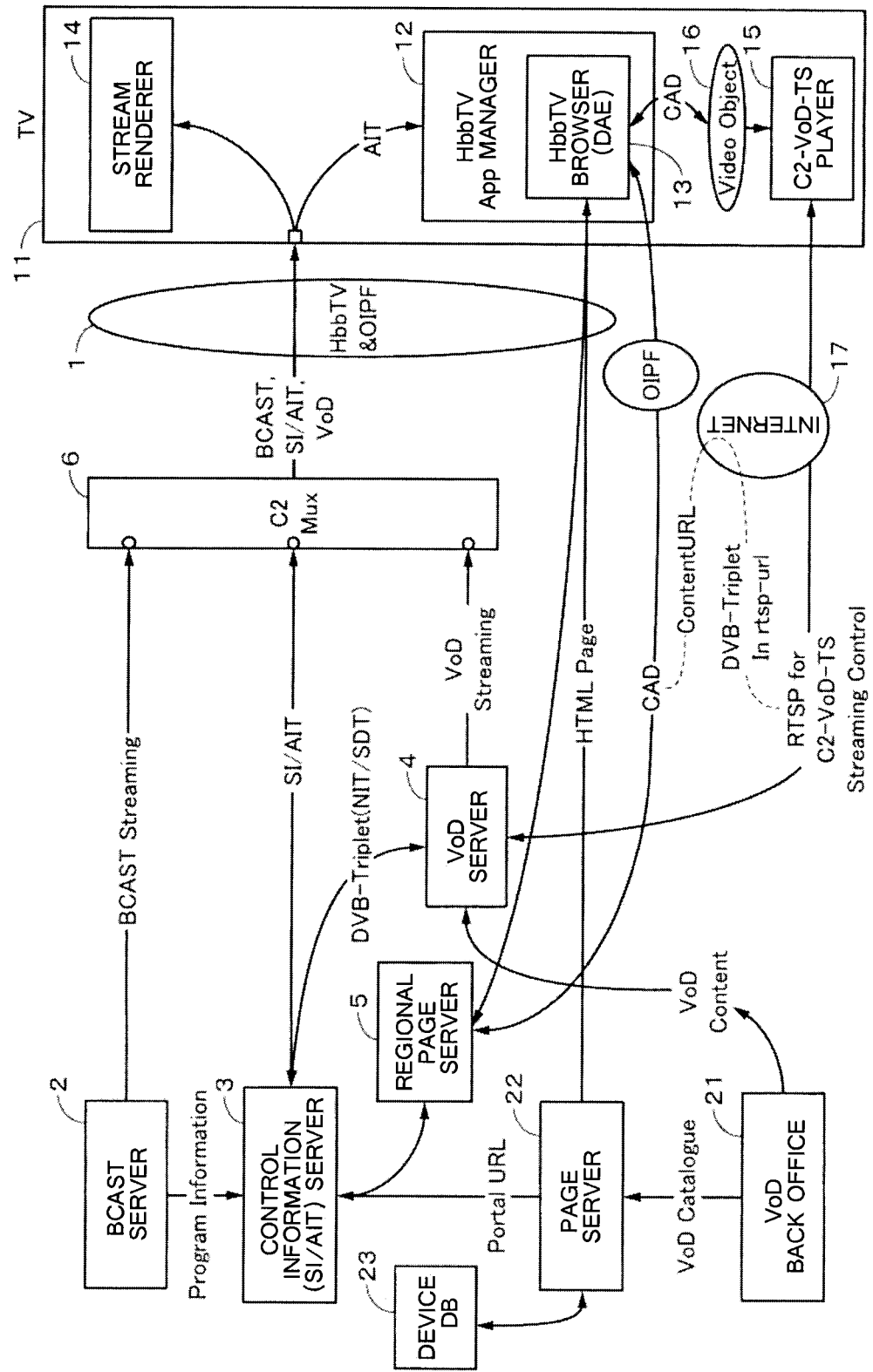
FIG. 1 is a block diagram illustrating one embodiment of a content delivery apparatus for content delivery according to the present disclosure.

Referring to FIG. 1, a content delivery system according to one embodiment of the present disclosure will be described. A cable network 1 of cable television which is a divided one corresponding to each of regions is used as one example of a first network which is capable of transmitting a large volume of content from a server to client terminals. As described below, a VoD channel is allocated to a bandwidth of the cable network 1 of each region beforehand, and thus this VoD channel is dynamically allocated in response to the demand for a VoD stream from an end device 11. The end device 11 is a terminal of an IPTV.

A head end of the cable television includes a broadcasting server 2, a control information server 3, a VOD server 4, a regional page server 5 and a multiplexer 6. The end device 11 is connected to the cable network 1. A large number of end devices 11 are connected, but only one end device 11 is illustrated in FIG. 1 for the purpose of simplicity.

The broadcasting server 2 outputs a broadcasting stream for IPTV broadcasting. That is, the broadcasting server 2 is installed at the cable head end of each region, and broadcasts a stream of the broadcasting channel (programs of traditional terrestrial broadcasting, satellite broadcasting, or cable broadcasting). Server program information is supplied to the control information server 3.

The control information server 3 is installed at the cable head end of each region. The control information server 3 is a server which broadcasts or sends DVB-SI (Service Information) information for the selection of a program by a viewer, or AIT (Application Information Table) for the control of a browser page. SI and AIT are control information necessary for reproducing a stream in MPEG2-TS. SI is a generic term for a group of tables in which to store information for specifying and reproduction of a stream in MPEG2-TS. One kind of SI tables is an SDT (Service Description Table) in which information on service (channel) is described. The channel information in stream is notified by SDT.

Specifically, AIT is stipulated in the specifications for HbbTV (hybrid broadcast broadband television). An address (ApplicationLocation) of a browser page is included among fields defined by AIT. In addition, AIT includes information which notifies the browser of a device of, for example, how to synchronize and execute (for control of the life cycle, such as synchronization with a program starting, ending, and connecting a page (control of synchronization with the content transmitted in another stream in MPEG2-TS)). A Portal URL is stored in the address (ApplicationLocation) of the browser page.

The VoD server 4 is installed at the cable head end of each region. The VoD server 4 sends out VoD content, provided from a VoD back office 21 over a network, in stream, to the end device through the multiplexer 6, which is among the cable sending-out system. The broadcasting stream, the control information stream, and the VoD stream are supplied to the multiplexer 6 and they are multiplexed. The multiplexed stream is transmitted to the end device 11 over the cable network 1.

The regional page server 5 generates a browser page of the corresponding portal, based on information on VoD content. The browser page is similar to, for example, EPG (Electorical Program Guide).

One center is established in the whole country to control all of the head ends of the regions in an integrated manner. The center includes a back office 21, a page server 22, and a device database 23. The back office 21 is a server to provide content. The page server 22, like the regional page server 5, generates the browser page based on information on VoD content.

The end device 11 includes an HbbTV application manager 12, a stream renderer 14, a player 15, and a video object 16. AIT, which is among receiving signals, is supplied to the HbbTV application manager 12. The HbbTV application manager 12 performs the process by the HbbTV browser 13. An HbbTV browser (DAE: Declarative Application Environment) is an HTML browser, which supports the browser specifications stipulated by the HbbTV standardization group.

The stream renderer 14 obtains a stream from the MPEG2-TS stream delivered over the cable network 1 by tuning in to a channel designated in DVB-Triplet, and performs reproduction control. DVB-Triplet is information for specifying a channel in MPEG2-TS stream to be allocated for delivery of the VoD stream, by ONID (OriginalNetworkID)>:<TSID (TransportStreamID)>:<SID (ServiceID)> in the VoD server 4. That is, DVB-Triplet is information used to specify a channel in the end device 11. A stream is transmitted to the end device 11 from the VoD server 4 over this channel (referred to properly as a VoD channel).

In addition, the head end and the end device 11 are connected to each other, over an IP network as a second network performing bidirectional communication, such as the Internet 17. Information for obtaining the demanded content is exchanged between the regional page server 5 and the page server 22, and the HbbTV browser 13 over the Internet 17. In addition, the request and the response are exchanged for control of streaming reproduction, between the VoD server 4 and the player 15. For exchange of information being performed over the Internet 17, the specification may be used which relates to IPTV whose specifications have been standardized.

The player 15 sends a reproduction control message of streaming to the VoD server 4, and is made to tune in to a stream channel by notifying the stream renderer 14 of information on DVB-Triplet at the same time as performing reproduction control. RTSP (Real Time Streaming Protocol) may be used as streaming reproduction control. The video object 16 is an interface library for allowing the browser side to control the player 15.

CAD (Content Access Descriptor Format) is a format standardized by OIPF (Open IPTV Forum) and is a place where information necessary to perform reproduction control of content is stored. DVB-Triblet is additionally stored in a ContentURL which is stored in a CAD file.

Because the VoD server 4 is installed in the cable network of each region, the supply of content from the back office 21 to VoD server 4 is performed over the network. At this point, the content itself may be distributed to the VoD server 4 for load distribution beforehand, and if the capability of the network of the backend permits, the content may be downloaded to the VoD server 4 on demand, whenever the reproduction request from the end device 11 occurs. In either case, the content is distributed or prepared ahead of the time, by forecasting popularity and request.

In one embodiment of the present disclosure, content from the VoD server 4 is delivered to the end device 11 over the cable network 1. On the other hand, because an amount of upward information to be sent from the end device 11 to the head end, for example, an amount of information of command for reproduction control of streaming is small, a command for streaming reproduction control is sent from the end device 11 over the IP network, for example, the Internet 17.

[Channel Allocation]

Figure 2:
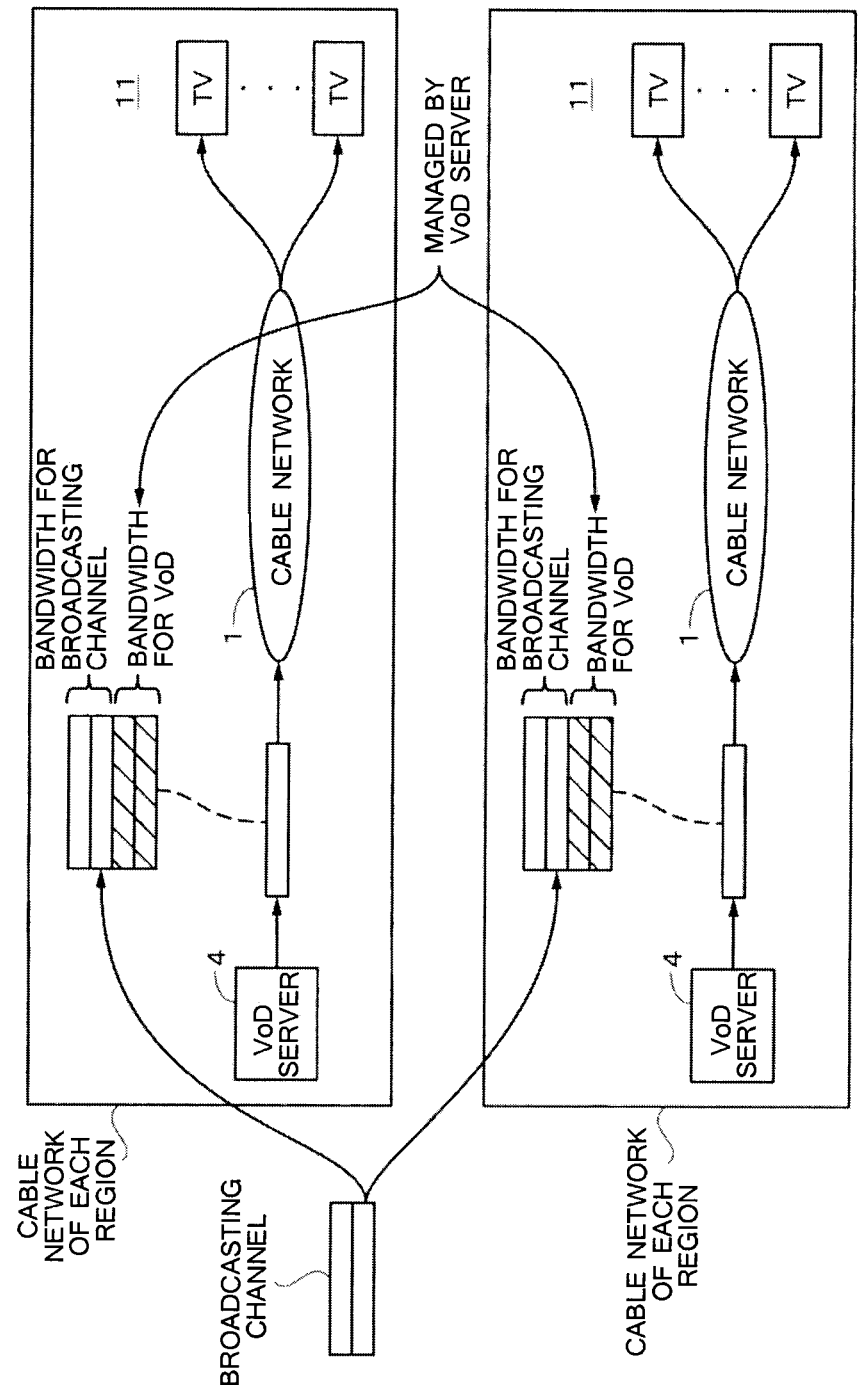
FIG. 2 is a schematic diagram that is used in describing one example of allocation control of VoD channel in one embodiment of the present disclosure.

In one embodiment of the present disclosure, VoD channels are allocated to the bandwidth of the cable network, which is divided for every region, beforehand, and are dynamically allocated in response to the VoD streaming demand by the end device. As illustrated in FIG. 2, the cable network is divided for each region. A broadcasting channel is common in the whole country, and the same broadcasting is delivered via the bandwidth for broadcasting channel. In the cable network of each region, the remaining bandwidth of the whole bandwidths, except for the bandwidth for the broadcasting channel, is allocated for the VoD beforehand. When there is a demand for VoD, from any of the end devices 11 in connection with the cable network 1, the bandwidth which is allocated to the VoD is set as a bandwidth for delivering the content to that end device 11. The information on channel allocation is stored in the control information server 3.

Figure 3:
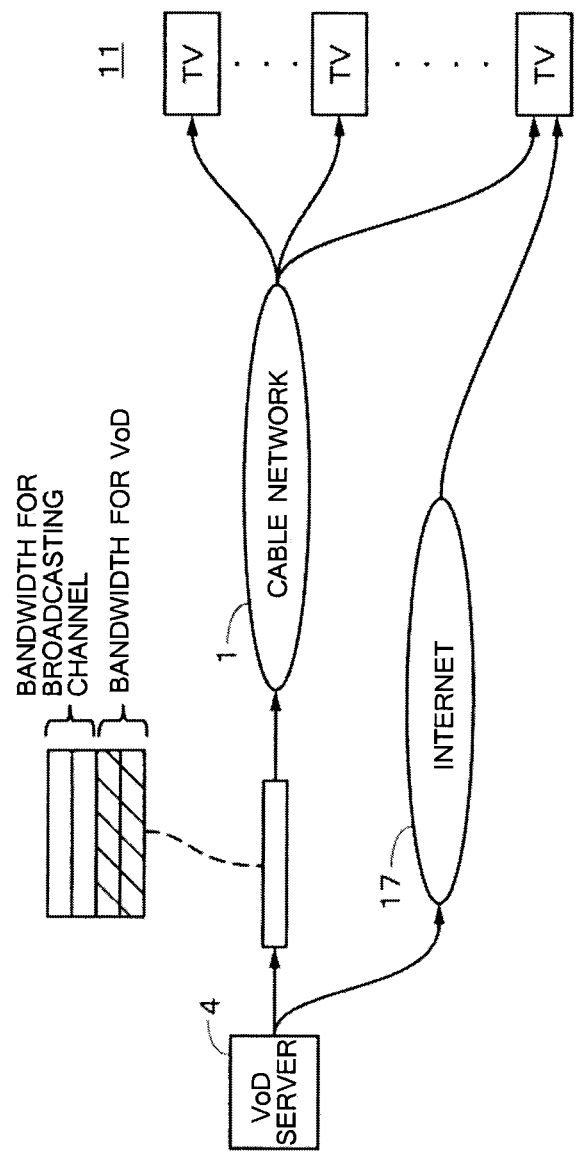
FIG. 3 is a schematic diagram that is used in describing another example of allocation control of VoD channel in one embodiment of the present disclosure.

In addition, when there are requests for establishment of a VoD session which are equal to or greater, in number, than the channels allocated for VoD beforehand, the IP network (the Internet) 17 is concurrently used, as illustrated in FIG. 3. Excessive requests may be absorbed by streaming over the IP network 17. As described above, in one embodiment of the present disclosure, information for control of streaming reproduction and information for acquisition of content is exchanged over the Internet 17. Therefore, VoD channels are simply established over the Internet 17.

[One Example of Process Flow]

Figure 4:
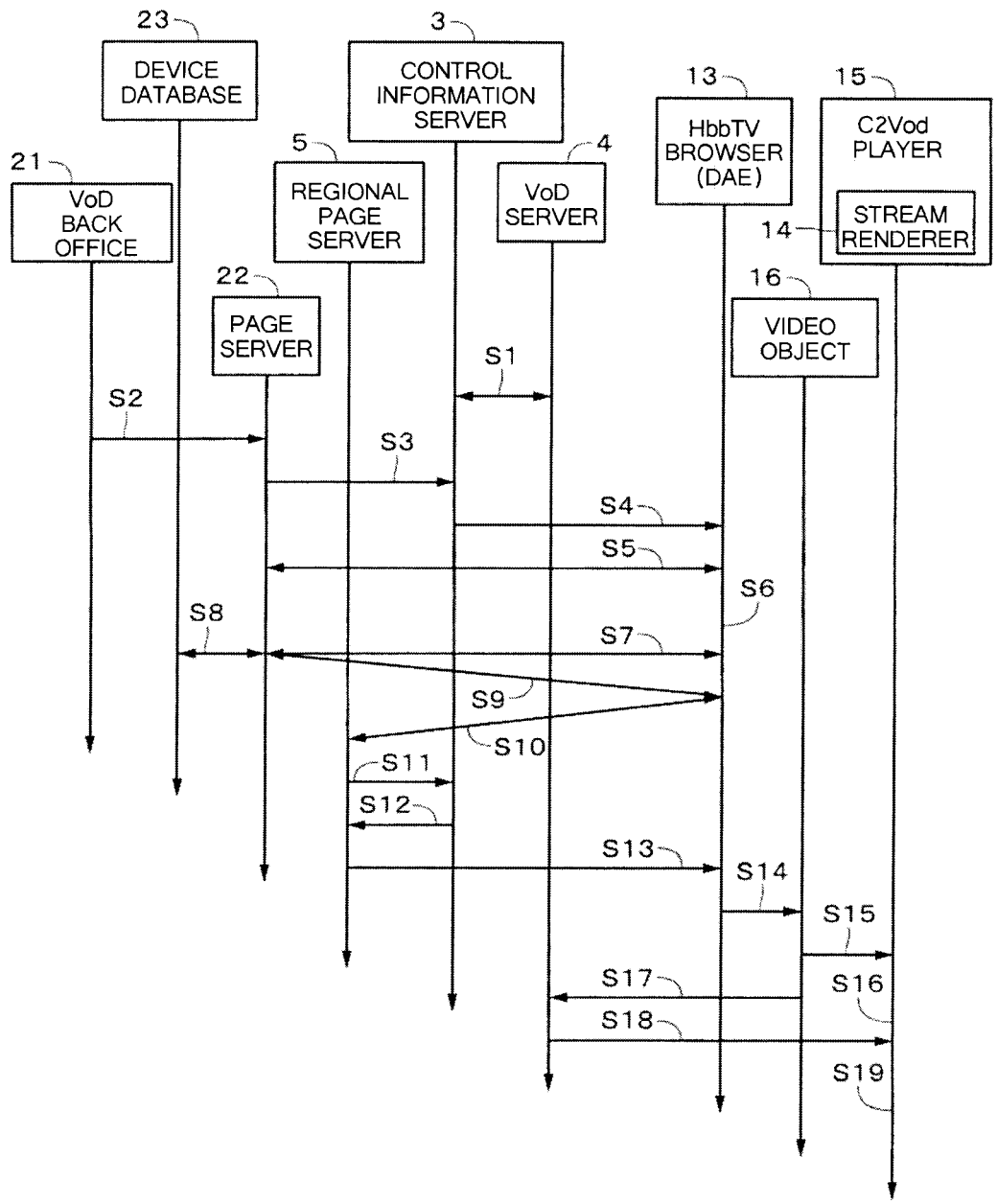
FIG. 4 is a flowchart that is used in describing one example of process flow of one embodiment of the present disclosure.

Referring to the flowchart in FIG. 4, a process flow of one embodiment of the present disclosure is described below.

In step S1, an allocation request for a VoD channel and a response to the request are made between the control information server 3 and the VoD server 4, and thus allocation of the VoD channel is made beforehand.

In step S2, a VoD catalog is handed over to the page server 22 from the back office 21. The VoD catalog is information on, for example, the attribute of the content. An image of a portal, like EPG, may be configured using the catalog.

In step S3, a portal URL (Uniform Resource Locator) is handed over to the control information server 3 from the page server 22.

In step S4, SDT and AIT notifies the HbbTV browser 13 of the portal URL and VoD channel information. When the HbbTV browser 13 is activated, it is supposed to obtain control information first, such as SDT and AIT.

In step S5, the HbbTV browser 13 accesses a page server 22.

In step S6, a portal page is browsed. Through this browsing, the content which a user wants to get is determined.

In step S7, not only is the selection of content made but also a device ID of the end device 11 is sent to the page server 22. The device ID indicates of which region this end device 11 is connected to the head end of the cable network.

In step S8, the page server 22 searches the device ID for the head end by referring to the device database 23, and specifies the regional page server 5.

In steps S9 and S10, it is shown that the redirection from the page server 22 to the regional page server 5 is performed. The device ID of the end device 11 is also sent to the regional page server 5.

In step S11, the regional page server 5 asks the control information server 3 for the allocation of a VoD channel. One of the VoD channels which are actually available among the empty VoD channels is allocated.

In step S12, the control information server 3 notifies the regional page server 5 of the corresponding DVB-Triplet.

In step S13, the regional page server 5 sends the CAD file to the HbbTV browser 13 of the end device 11. The DVB-Triblet is added to and stored in the ContentURL stored in the CAD file.

In step S14, the HbbTV browser 13 activates the video object 16 by handing over the CAD file.

In step S15, the video object 16 notifies the player 15 (including the stream renderer 14) of the DVB-Triblet.

In step S16, the player 15 tunes in to the DVB-Triblet and awaits a stream.

In steps S17 and S18, reproduction control of the ContentURL (an element of the CAD file) is performed. That is, the request is sent from the video object 16 to the VoD server 4, and the response is sent from the VoD server 4 to the player 15 (renderer 14). When the reproduction control, for example, for the double-speed reproduction is performed, the content is also delivered through the same VoD channel.

In step S19, streaming reproduction is performed, and the delivered content is displayed by the renderer 14 on a reproduction device (for example, a display) provided in the end device 11.

[Another Example of Process Flow]

Figure 5:
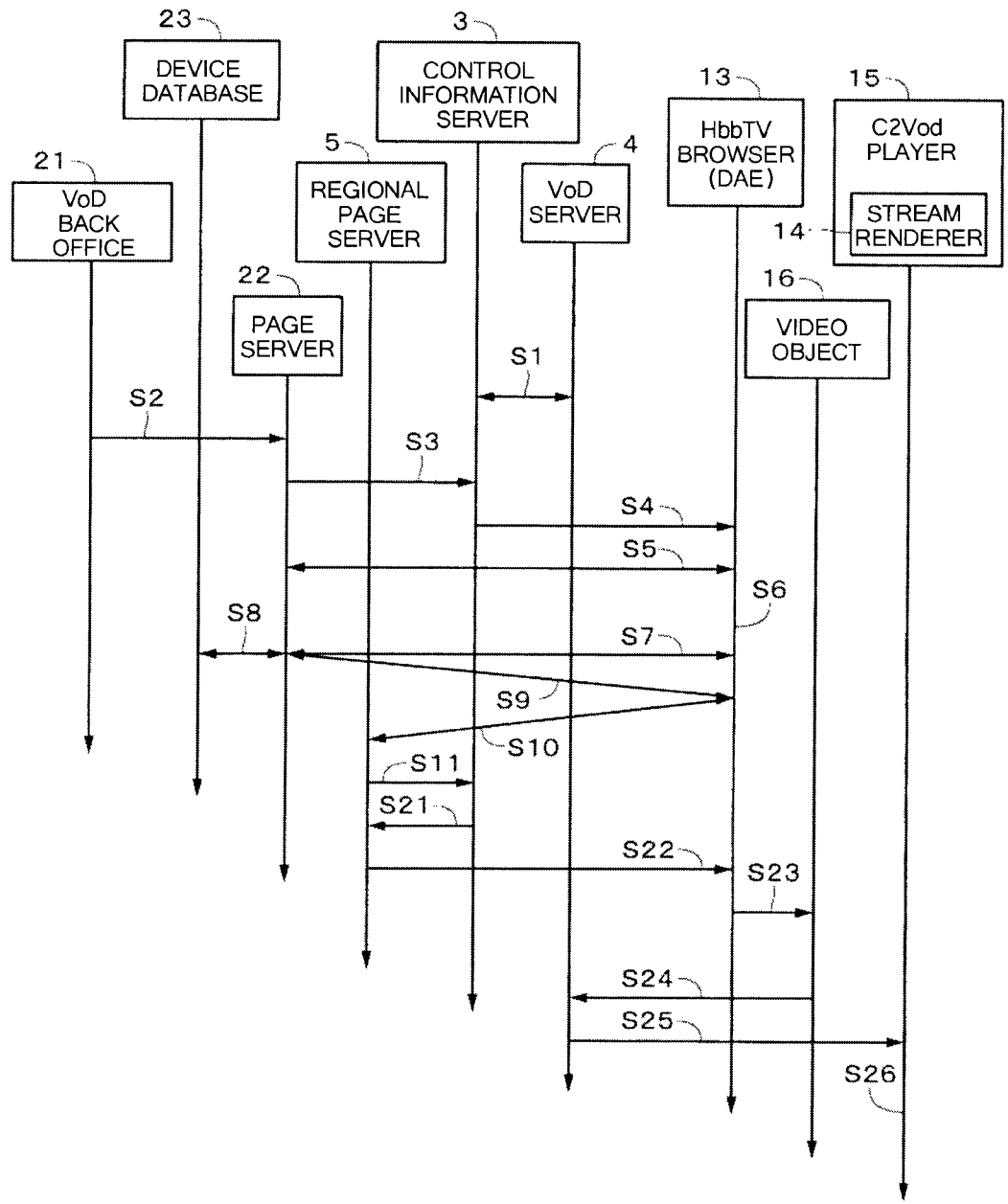
FIG. 5 is a flowchart that is used in describing another example of process flow of one embodiment of the present disclosure.

As described referring to FIG. 3, the process flow in a case of concurrently using the IP network (the Internet) 8 is described referring to FIG. 5. Like one example of the process described above, the process of from steps S1 to S11 (the regional page server 5 asks the control information server 3 for the allocation of VoD channel) is performed.

In the cable network, step S21 is performed because the VoD channel cannot be allocated in response to the request in step S11.

In step S21, the control information server 3 notifies the regional page server 5 of an alternative URL.

In step S22, the regional page server 5 adds the alternative URL to the ContentURL which is stored in the CAD file, stores the resultant, and notifies the HbbTV browser 13 of the end device 11 of the corresponding CAD file.

In step S23, the HbbTV browser 13 activates the video object 16 by handing over the CAD file.

In steps S24 and S25, reproduction control of the alternative URL is performed. That is, the request is sent from the video object 16 to the VoD server 4 and the response is sent from the VoD server 4 to the player 15 (renderer 14). When the reproduction control, for example, for the double-speed reproduction is performed, the content is also delivered through the same VoD channel.

In step S26, the streaming reproduction is performed, and the delivered content is displayed by the renderer 14 on the reproduction device (for example, a display) provided in the end device 11.

[Example of Streaming Reproduction Control]

For example, RTSP (Real Time Streaming Protocol) may be used as the streaming reproduction control. The RTSP is a protocol for controlling real time data distribution (streaming) standardized in IETF. The RTSP is a protocol for remote manipulation of a server containing multimedia data such as audio data and video data. An operation such as reproduction, stop, or recording can be performed. By use of the RTSP, an RTSP server, which is used frequently in the IPTV service of which QOS (Quality Of Service) is guaranteed, can be used as the VoD server 4.

Figure 6:
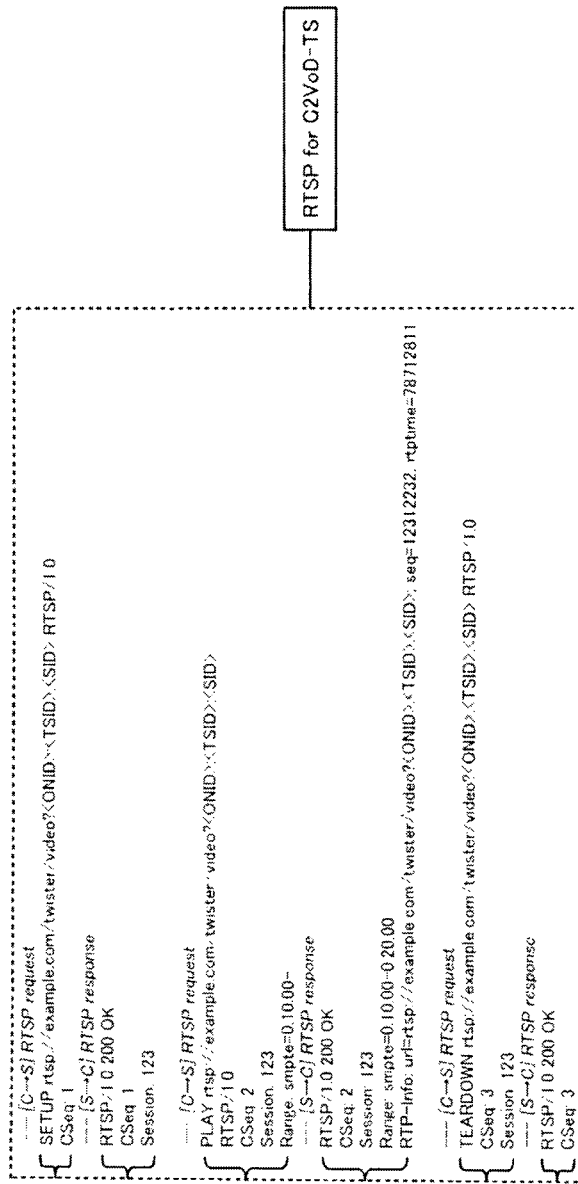
FIG. 6 is a schematic diagram of one example of a protocol for the streaming reproduction control that can be used in one embodiment of the present disclosure.

As the specific example is illustrated in FIG. 6, the streaming reproduction control using the RTSP is performed. In FIG. 6, the letter C represents the end device 11 as a client, and the letter S represents the VoD server 4. The expression [C→S] means access to the VoD server 4 from the end device 11. The expression [S→C] means access to the end device 11 from the VoD server 4. The expression <ONID><TSID><SID> in FIG. 6 means DVB-Triblet. The terms SETUP, PLAY, TEARDOWN, and the like mean commands. For example, the term SETUP means start, the term PLAY means reproduction of content, and the term TEARDOWN means close session.

An equivalent command set may be created even in a case of using another protocol, for example, HTTP (HyperText Transfer Protocol), without being limited to the use of RTSP. In a case of using HTTP, there is no need of a change in the configuration of the server in the network, and the existing HTTP-based CDN (Content Delivery Network) service can be used, which may reduce a purchasing cost.

2. Variation

In one embodiment of the present disclosure, upon request from the end device for multi cast streaming, one channel may be allocated to the multi cast streaming.

In the present disclosure, the page server is divided into the general page server 22 and the regional page server 5. However, the regional page server 5 may not be provided. In this case, a redirection operation is unnecessary, but there is a concern that the load to the page server increases. Similarly, the VoD server may be commonly installed for sharing in the whole country, without having to be installed in each region.

Furthermore, besides the cable network, a network, which has a broad downward bandwidth and to which an extremely large number of client terminals are not connected, may be used.

REFERENCE SIGNS LIST

1 Cable network
2 Broadcasting server
3 Control information server
4 VoD server
5 Regional page server
11 End device
12 HbbTV application manager
13 HbbTV browser
14 Stream renderer
15 Player
17 Internet

The invention claimed is:

1. A content delivery system comprising:
a first network comprising a plurality of dynamically allocated channels;
a transmitting server;
a client end device operatively connected to the transmitting server via the first network, wherein at least one of the dynamically allocated channels from the first network comprises downward transmission bandwidth for transmitting content demanded by the client end device; and
a second network connected to the client end device and configured as a bidirectional IP network, wherein the client end device is configured to:
    demand, via the first network, broadcasting content from the transmitting server,
    receive, from the transmitting server, control information including address information used to access the transmitting server,
    transmit an access request to the transmitting server over the second network using the address information, requesting access to the transmitting server,
    transmit, to the transmitting server, information used to obtain the broadcasting content and information used to control reproduction of the broadcasting content between the client end device and the transmitting server over the second network, and
    receive, concurrently via both the first network and the second network, the broadcasting content, when a number of demands for the broadcasting content is equal to or greater than a number of channels dynamically allocated for delivery of the broadcasting content.

2. The content delivery system according to claim 1, wherein:
the broadcasting content is delivered to the client end device over one of the plurality of the dynamically allocated channels of the first network,
a channel, other than the channel on which the broadcasting content is to be delivered, is allocated for delivery of the broadcasting content demanded by the client end device, and
information on allocation of the channel is stored in the transmitting server.

3. The content delivery system according to claim 2, wherein
the broadcasting content is delivered over the second network, if the number of channels dynamically allocated for delivery of the broadcasting content is smaller in number than the client end devices which demand the broadcasting content.

4. The content delivery system according to claim 1, wherein:
the transmitting server includes a broadcasting server configured to deliver the broadcasting content, a control information server configured to deliver the control information, and a content server configured to deliver the broadcasting content; and
each of the broadcasting server, the control information server, and the content server concurrently outputs a stream.

5. The content delivery system according to claim 1, wherein
the first network is a cable television network, and
the second network is the Internet.

6. A method for content delivery comprising:
connecting a transmitting server to a client end device via a first network and a second network, wherein
the first network comprises a plurality of dynamically allocated channels, wherein at least one of the dynamically allocated channels from the first network comprises downward transmission bandwidth for transmitting content demanded by the client end device, and
the second network is connected to the client end device and configured as a bidirectional IP network;
demanding, from the client end device, via the first network, broadcasting content from the transmitting server;
dynamically allocating channels, via the client end device, in the first network;
receiving, at the client end device, control information from the transmitting server, wherein the control information includes address information used to access the transmitting server;
transmitting, using a processor, a request to access the transmitting server using the address information, wherein the transmission is over the second network;
transmitting to the transmitting server, information used to obtain the broadcasting content and information used to control reproduction of the broadcasting content between the client end device and the transmitting server over the second network; and
receiving, concurrently via both the first network and the second network, the broadcasting content, when a number of demands for the broadcasting content is equal to or greater than a number of channels dynamically allocated for delivery of the broadcasting content.

7. A transmitting server comprising:
a processor configured to:
concurrently connect to a client end device via a first network comprising a plurality of dynamically allocated channels and a second network configured as a bidirectional IP network,
receive, from a client end device, a demand for broadcasting content via the first network,
transmit, in response to the request, control information including address information used by the client end device to access the transmitting server, and
receive an access request over the second network using the address information, requesting access, receive, from the client end device, information used to obtain the broadcasting content and information used to control reproduction of the broadcasting content, with the client end device over the second network,
transmit, concurrently via both the first network and the second network, the broadcasting content to the client end device, when a number of demands for the broadcasting content is equal to or greater than a number of channels dynamically allocated for delivery of the broadcasting content.

8. The transmitting server according to claim 7, further configured to:
deliver the broadcasting content to the client end device over one of the plurality of dynamically allocated channels of the first network,
allocate a second channel, other than the channel on which the broadcasting content is to be delivered for delivery of the broadcasting content demanded by the client end device, and
store information on allocation of the second channel.

9. The transmitting server according to claim 8, wherein
the broadcasting content is delivered over the second network, if channels allocable for delivery of the broadcasting content are smaller in number than the client end devices which demand the broadcasting content.

10. The transmitting server according to claim 7, comprising:
a broadcasting server configured to deliver the broadcasting content;
a control information server configured to deliver the control information; and
a content server configured to deliver the broadcasting content,
wherein each of the broadcasting server, the control information server, and the content server outputs a stream.

11. The transmitting server according to claim 7, wherein
the first network is a cable television network, and the second network is the Internet.

12. A client end device comprising:
circuitry configured to
demand, via the first network, content from the transmitting server,
receive, from the transmitting server, control information including address information used to access the transmitting server,
transmit an access request to the transmitting server over the second network using the address information,
receive, from the transmitting server, a reply to the access request,
transmit to the transmitting server, via one or more of the first network and the second network, information used to obtain the content and information used to control reproduction of the broadcasting content between the client end device and the transmitting server over the second network, and
receive, concurrently via both the first network and the second network, the content, when a number of demands for the content is equal to or greater than a number of channels dynamically allocated for delivery of the content.

* * * * *